United States Patent [19]

Fuller

[11] Patent Number: 4,788,862
[45] Date of Patent: Dec. 6, 1988

[54] PLASTIC MEASURING SCOOP WITH FOLDABLE HANDLE

[75] Inventor: Ronald C. Fuller, Evansville, Ind.

[73] Assignee: Bristol-Myers Company, New York, N.Y.

[21] Appl. No.: 72,957

[22] Filed: Jul. 15, 1987

[51] Int. Cl.⁴ .................. G01F 19/00; A47J 43/28
[52] U.S. Cl. ........................... 73/426; 16/225; 16/337; 16/374; 30/324; 30/143
[58] Field of Search .............. 73/426, 427, 428, 439; 30/324, 325, 326, 327, 328, 143; 16/115, 225, 227, 337, 374, DIG. 13

[56] References Cited

U.S. PATENT DOCUMENTS

| | | |
|---|---|---|
| D. 127,543 | 5/1941 | Strand, Jr. |
| D. 213,719 | 4/1969 | Gerlich |
| D. 235,405 | 6/1975 | Brown et al. |
| D. 274,776 | 7/1984 | Molloy et al. |
| D. 274,777 | 7/1984 | Wolff |
| D. 275,063 | 8/1984 | Greene |
| 1,321,670 | 11/1919 | Popper .................. 30/143 |
| 1,372,325 | 3/1921 | Willemin ............... 30/143 |
| 1,805,401 | 5/1931 | Janney ................... 16/337 |
| 2,230,479 | 2/1941 | Becher ................... 73/429 |
| 2,603,093 | 7/1952 | Cordova |
| 2,799,086 | 7/1957 | Tupper |
| 2,812,577 | 11/1957 | Leibow .................. 30/324 |
| 2,921,707 | 1/1960 | Sloan ..................... 73/427 |
| 3,013,436 | 12/1961 | Dailey .................... 73/426 |
| 3,526,138 | 8/1968 | Swett et al. |
| 3,931,741 | 1/1976 | Ceccarelli .............. 73/427 |
| 4,457,458 | 7/1984 | Heinol ................... 16/227 |
| 4,589,204 | 5/1986 | Vogel ..................... 30/324 |
| 4,615,120 | 10/1986 | Newman ................. 30/324 |

FOREIGN PATENT DOCUMENTS 0643392 6/1962 Canada .................. 73/426

*Primary Examiner*—William A. Cuchlinski, Jr.
*Assistant Examiner*—Thomas B. Will
*Attorney, Agent, or Firm*—Robert H. Uloth

[57] ABSTRACT

A plastic molded measuring scoop assembly includes a generally cylindrical measuring scoop and a hinged handle assembly which is comprised of a fixed inner handle portion and a foldable outer handle portion. The inner handle portion carries a latching channel at its outer end and the inner end of the foldable handle portion carries upper and lower latching fins. The cooperation between these fins and the latching channel retain the foldable handle portion of the handle assembly in either a folded storage position or an unfolded use position.

3 Claims, 3 Drawing Sheets

PLASTIC MEASURING SCOOP WITH FOLDABLE HANDLE

FIELD OF THE INVENTION

The present invention is directed generally to a measuring device. More particularly, the present invention is directed to a plastic measuring scoop with a foldable handle. Most specifically, the present invention is directed to a plastic measuring scoop having a foldable handle which is selectively positionable in either a folded or unfolded configuration. The handle assembly is formed intermediate its ends with a transverse hinge about which the outer of foldable end of the handle can fold with respect to the inner or fixed portion of the handle. The plastic measuring scoop's handle can thus be folded to make the scoop assembly much more compact thereby facilitating packaging of the scoop in a container during filling, or storage of the scoop. During use of the measuring scoop, the handle can be unfolded to increase the useful length of the scoop. The cooperation of a securement channel and a pair of spaced ribs or fins, which are receivable in the channel, form positive securement means to retain the handle in either its folded or unfolded configurations.

DESCRIPTION OF THE PRIOR ART

Measuring scoops or spoons are generally quite well known in the prior art. Devices of this general type almost universally are either stamped from metal or are molded of plastic and have a measuring cup, scoop, or spoon portion, and an elongated handle which extends away from the scoop. Exemplary of devices of this type are those shown in the following patents:

| Patents | Inventors |
| --- | --- |
| D 127,543 | Strand, Jr. |
| D 213,719 | Gerlich |
| D 235,405 | Brown et al |
| D 274,776 | Molloy et al |
| D 274,777 | Wolff |
| D 275,063 | Greene |
| 2,603,093 | Cordova |
| 2,799,086 | Tupper |
| 3,013,436 | Dailey |
| 3,526,138 | Swett et al |

It is not unusual for a molded plastic measuring device such as a scoop or spoon to be included with a granular or powdered substance during packaging of the substance. Measuring scoops and spoons of this type may be found in powdered baby formulas, other dry or powdered nutritional formulations, prepackaged ground coffee and often also in various non-edible materials. These scoops are usually provided by the manufacturer of the powdered or granular product for the convenience of the consumer, and to insure that the user of the product is provided with a ready means to dispense the correct quantity of the product.

A plastic measuring scoop which is being included by the manufacturer or packer of a commodity for use by the consumer should be both inexpensive and durable. Since the scoop is essentially being given away, its unit cost cannot be particularly great. At the same time, the scoop must be strong enough to perform its intended function. It also must be easily packageable and should be of sufficient capacity and length to allow the consumer to easily reach the bottom of the container with the scoop and to remove enough material in each scoop so that the process is not onerous.

Plastic disposable measuring scoops that are to be packed in a container, such as a can, with the product to be dispensed, are often placed in an inverted empty container before its contents are added. Once the can's contents have been added, a bottom end is placed on the can and it is then shipped. This procedure places the dispensing scoop in the upper portion of the filled can so that it can be easily located with the container is first opened. Since the measuring scoop should be placed flat against the top of the can prior to filling, this restricts the size of the scoop and its handle. The overall length of the scoop and handle should not be greater than the inner diameter of the container for best packaging results. If the handle is too long, the scoop will not lie flat but instead must be placed diagonally in the container. This may result in filling voids and resultant underweight packages. Any attempts to bend the handle of the scoop are apt to be unsatisfactory. Since the molded plastic material has a memory, the scoop handle will attempt to return to its original configuration. This may result in spillage of the container's product on initial opening as the scoop handle springs back to its original shape.

The alternative to providing a scoop with as long a handle as possible is to shorten the handle's length. This eliminates packaging problems since the scoop now easily fits within the container. Unfortunately, the scoop becomes less useful as its handle length is decreased. A scoop which cannot reach to the bottom of the container is not convenient and is apt not to be used. Thus, the consumer is inconvenienced, and more importantly, may make errors in measuring a desired amount of product if the scoop handle is not long enough. Where the product being measured is a nutritional formulation such as a powdered baby formula, it is essential that the manufacturer's instructions be followed as the material is being measured. Furthermore, a short handled scoop requires the user to reach a hand down into the container. This becomes a source of contamination as the hand can easily come into direct contact with the product. The long handled scoop of the instant invention will significantly reduce the probability of the hand entering the can and touching the product as the product is scooped from the can.

The prior art has not satisfactorily addressed the problem of providing a measuring scoop or spoon that is able to overcome the above discussed problems. The prior patents listed above, while showing various spoons and scoops, do not provide any solution to the problem of how to provide a measuring device that has an overall size small enough to allow for easy packaging, yet which has a handle length that will afford easy access to the bottom of the container. The plastic measuring scoop with folding handle of the present invention provides a device which overcomes the limitations of the various prior art devices.

SUMMARY OF THE INVENTION

It is an object of the present invention to provide a plastic measuring scoop.

Another object of the present invention is to provide a plastic measuring scoop having a foldable handle.

A further object of the present invention is to provide a plastic measuring scoop having a one piece molded construction.

Yet another object of the present invention is to provide a molded plastic measuring scoop with a foldable handle and including handle position retaining means.

Still a further object of the present invention is to provide a molded plastic scoop with a foldable handle that is inexpensive and durable.

Even another object of the present invention is to provide a molded plastic scoop with a foldable handle that is easily molded from an inert material.

As will be discussed in greater detail in the description of the preferred embodiment which is set forth subsequently, the molded plastic measuring scoop in accordance with the present invention includes an elongated handle assembly that is foldable intermediate its ends about a transverse hinge line. The outer portion of the inner fixed handle portion includes a securement channel which receives one of two spaced handle latching finds that are formed on opposed sides of the inner portion of the outer foldable handle portion. These latching fins are both sized and structured to fit within the securement channel and to thereby positively retain the foldable handle portion in either a folded or unfolded configuration.

The transverse hinge line is positioned along the length of the foldable handle assembly at a point such that when the dispensing scoop is in its handle folded mode, the free end of the outer foldable handle portion overlies the open mouth of the product measuring scoop or spoon. This reduces the overall length of the scoop assembly by approximately one half. In its folded configuration, the measuring scoop or spoon of the present invention can be placed flat against the inner surface of a container's upper lid during packaging. This simplifies packaging and filling without giving up convenience and ease of use. The folded handle is positively retained by the interaction of the securement channel and upper latching fin. This insures that the folded handle will remain folded until removed from the container and unfolded by the consumer. The handle may also be again latched or held in the folded position after it has been used so that it can be stored in the container.

By unfolding the scoop's handle and placing the lower latching fin in the securement channel, the useable length of the handle of the measuring scoop of the present invention is doubled. This allows easy access to, and proper measuring of the contents of a partially emptied container. A pair of abutment faces on the lower latching fin interact with the walls of the securement channel to limit unfolding of the handle. These abutment fins also add strength to the handle latch means and prevent the outer handle section from unfolding beyond a generally coplanar orientation with respect to the inner, fixed handle section. This also allows the user to impart sufficient force to the scoop to remove powdered or granular materials which may tend to become caked or hardened.

The plastic measuring scoop and folding handle in accordance with the present invention is quickly and inexpensively formed in a single molding process from any one of a number of possible plastic materials. As such, it is not expensive to manufacture and can be added to packages of consumer products without great cost. Since it can be molded from one of several inert plastic materials, it can be packaged with various nutritional formulations such as powdered infant formulas without fear of product contamination or adulturation.

The plastic molded measuring scoop having a foldable handle in accordance with the present invention satisfies the conflicting needs for low cost and durability. It provides a neat, compact assembly that can quickly be opened and held in place to facilitate product dispensing. It is stable, inert, rugged and may be retained by the consumer after the product has been used thereby keeping the manufacturer's name before the consumer. The plastic measuring scoop in accordance with the present invention thus represents a substantial advance in the art.

BRIEF DESCRIPTION OF THE DRAWINGS

While the novel features of the plastic measuring scoop with foldable handle in accordance with the present invention are set forth with particularity in the appended claims, a full and complete understanding of the invention may be had by referring to the detailed description of the preferred embodiment, and as illustrated in the accompanying drawings in which:

DESCRIPTION OF THE PREFERRED EMBODIMENT

Figure 1:
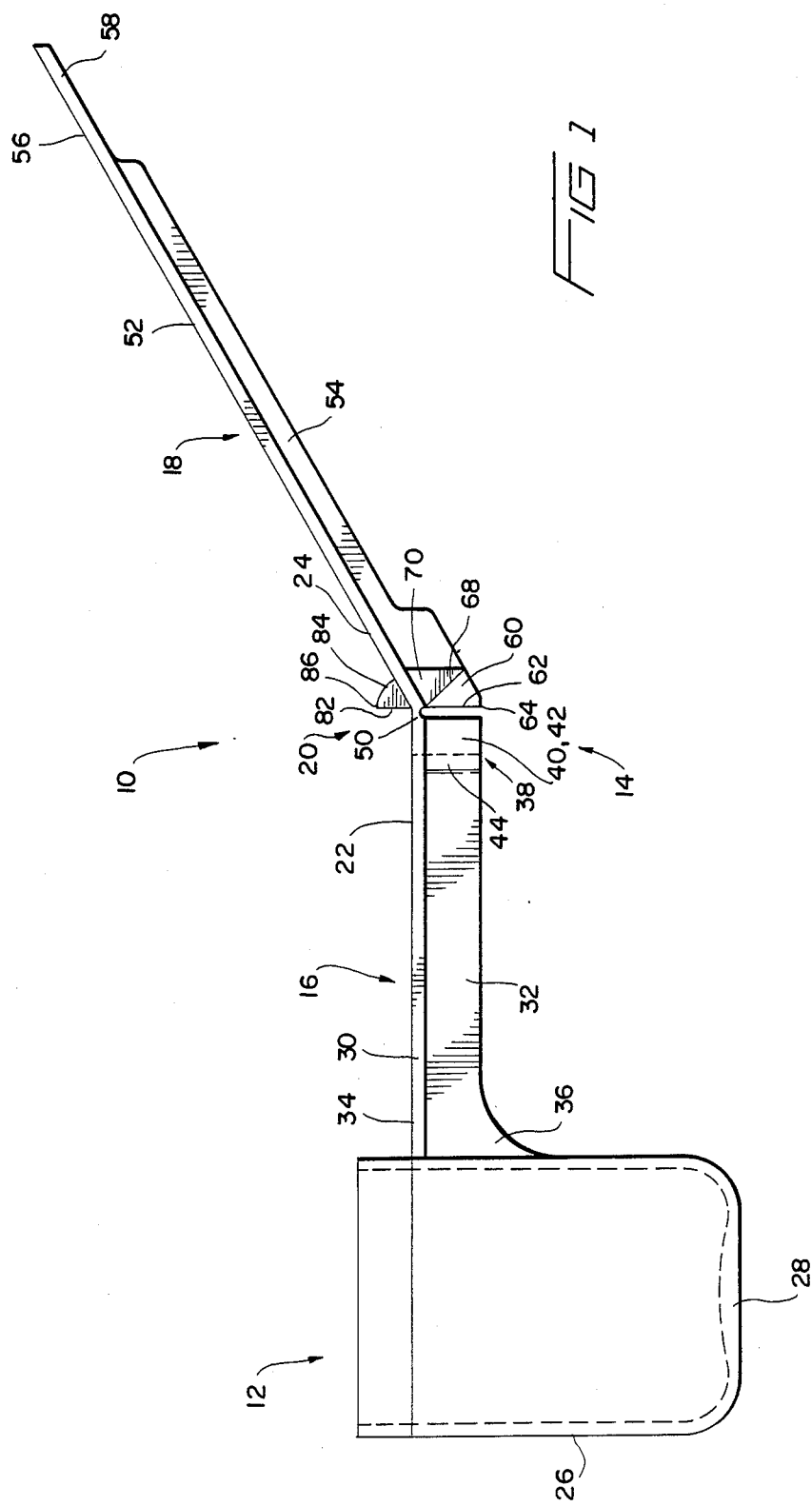
FIG. 1 is a side elevation view of the plastic measuring scoop of the present invention and showing the foldable handle positioned intermediate its folded and unfolded configurations.

Turning initially to FIG. 1, there may be seen, generally at 10, a preferred embodiment of a plastic measuring scoop with a foldable handle in accordance with the present invention. Measuring scoop assembly 10 includes a generally cylindrical scoop or measuring portion 12 and a hinged handle assembly 14 which is comprised of an inner fixed handle portion 16 and an outer foldable handle portion 18. A hinge and handle securement assembly, generally at 20 interconnects an outer end 22 of fixed handle portion 16 with an inner end 24 of foldable handle portion 18.

Figure 2:
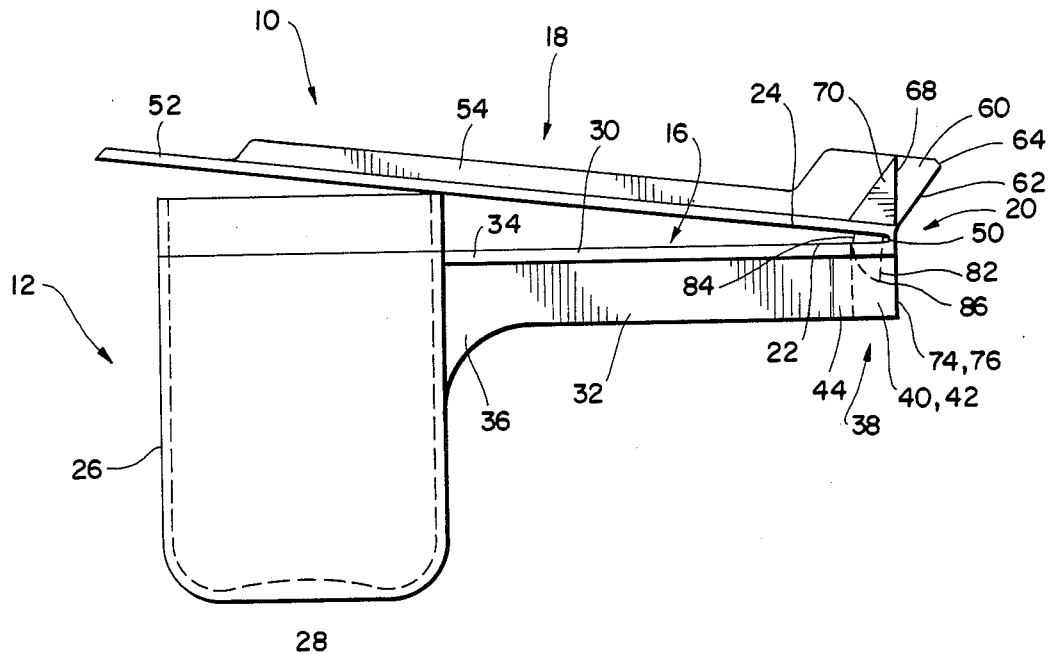
FIG. 2 is a side elevation view of the plastic measuring scoop of the present invention and showing the handle fully folded.
Figure 4:
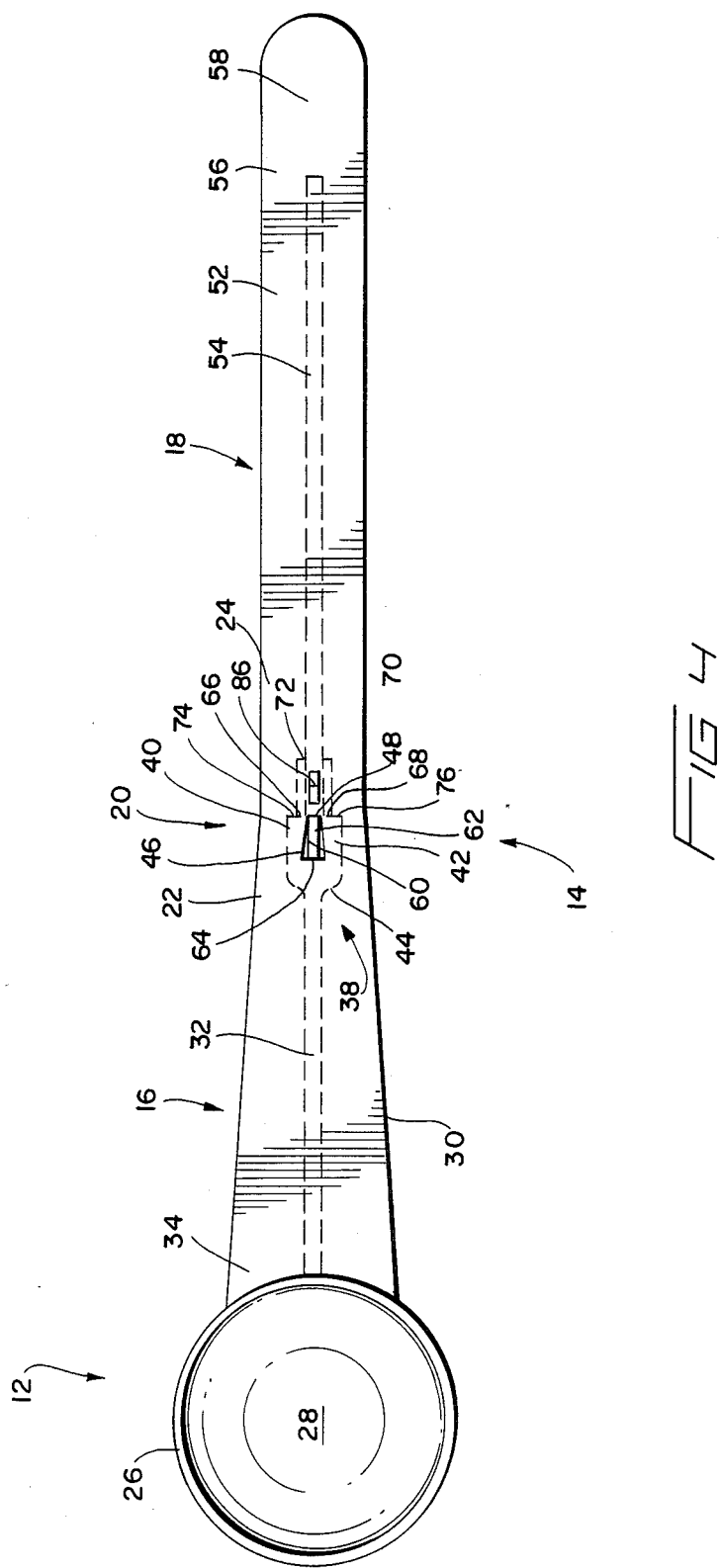
FIG. 4 is a top plan view of the plastic measuring scoop of the present invention and showing the handle fully unfolded.

Measuring scoop 12, as may be see most clearly in FIGS. 1, 2 and 4, is a generally right circular cylinder having a side wall 26 and a generally flat bottom 28. It will be seen that bottom surface 28 is generally planar and that side wall 26 is generally perpendicular to the plane of bottom 28. This configuration is merely exemplary of any number of specific sizes and configurations that could be utilized to form scoop or measuring portion 12 of the plastic measuring scoop with a foldable handle 10 in accordance with the present invention. Further, scoop or measuring portion 12 could, if desired, be provided with suitable indicia to facilitate measurement of part scoop quantities.

Referring again to FIGS. 1, 2 and 4, inner fixed handle portion 16 includes a generally planar, horizontal handle web 30, and a generally vertical midline reinforcing rib 32. Reinforcing rib 32 is formed beneath handle web 30 and is generally perpendicular thereto. As may be seen in FIGS. 3 and 4, an inner end 34 of web 30 of inner fixed handle 16 has a width that is greater than its width adjacent the outer end 22 of inner handle 16. This increases the attachment strength between the side wall 26 of scoop 12 and the inner end 34 of fixed handle segment 16. In a similar manner as shown in FIGS. 1 and 2, the inner fixed handle reinforcing rib 32 joins the sidewall 26 of scoop 12 in a curved web portion 36. This also increases the attachment strength between the scoop 12 and the handle assembly 14. This insures that the one piece molded plastic measuring scoop assembly 10 of the present invention will have sufficient strength and rigidity during use.

As may be seen in FIGS. 1, 2 and 4, the inner handle reinforcing rib 32 terminates at the outer end of fixed handle portion 16 in a latching or securement channel 38 which is comprised of spaced side walls 40, and 42 and rear wall 44. As may be seen in FIG. 4, these three walls 40, 42, and 44 cooperate to define a latching or securement fin securing chamber 46 that is somewhat trapezoidal in plan view since its side walls 40 and 42 are angled slightly toward each other and have a reduced spacing at their portions adjacent the outer end 22 of fixed handle portion 16 as compared to their spacing at their intersection with channel rear wall 44. It will be understood that fin receiving securement channel 38 is only three sided; i.e. having side walls 40 and 42 and rear wall 44 so as to have an open, generally vertical slot 48 at the outer end 22 of inner fixed handle portion 16.

Turning now particularly to FIGS. 1 and 2, which show outer foldable handle portion 18 in intermediate and fully folded positions respectively, it will be seen that the inner end 24 of outer foldable handle portion 18 is joined to the outer end 22 of inner fixed handle portion 16 by a so-called living hinge 50. This is essentially a reduced thickness connector between the two handle portions 16 and 18. This living hinge 50 will allow foldable handle portion 18 to be folded and unfolded about fixed handle portion 16 at least several hundred times without ripping or tearing. As may be seen in FIGS. 1 and 4, outer foldable handle portion 18 includes generally a planar outer handle web 52 and a generally vertical midline reinforcing rib 54. Foldable handle rib 54 terminates before reaching an outer end 56 of foldable handle portion 18 thus providing a flat gripping surface 58 at the free outer end 56 of foldable handle portion 18.

Foldable handle rib 54 is molded having a lower latching or securement fin 60 at the inner end 24 of foldable handle portion 18. As may be seen in FIG. 3, this lower latching fin is of the same thickness as the rest of rib 54 and has a height generally the same as that of rib 32 of fixed handle portion 16. Further, as may be seen most clearly in FIG. 2, securement fin 60 has an angled leading edge 62 so that when it is moved into latching or securement channel 38, a forwardmost point 64 of lower latching fin 60 will either abut, or will be in close proximity to rear wall 44 of channel 38 thereby helping to limit the downward motion of the free end 56 of foldable handle portion 18.

Figure 3:
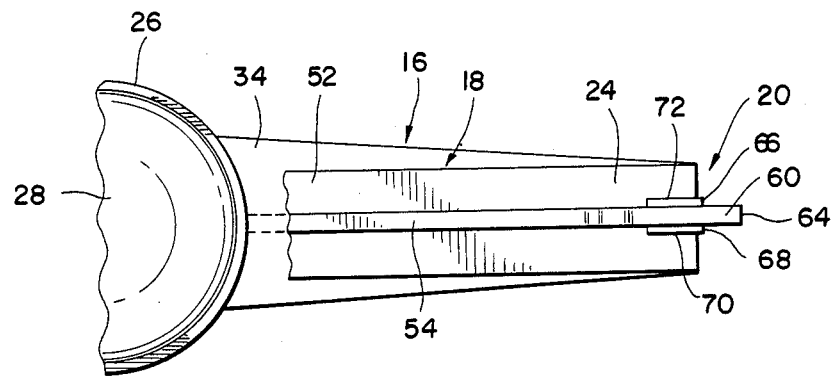
FIG. 3 is a top plan view of the handle portion of the plastic measuring scoop and showing the handle fully folded.

As most clearly seen in FIGS. 3 and 4, downward movement of the foldable handle portion 18 is also limited by a pair of abutment faces 66 and 68 which each form one side of generally triangular shaped lower latching fin reinforcement members 70 and 72 that are spaced on opposite sides of the inner end of foldable handle reinforcing rib 54. As may be seen in FIGS. 1 and 2, abutment face 68 (and the corresponding abutment face 66 not shown) are generally perpendicular to the outer handle web 52 so that, as may be seen in dashed lines in FIG. 4, when the foldable handle portion 18 is in its fully unfolded orientation so that it is ready for use, abutment faces 66 and 68 abut end surfaces 74 and 76 of side walls 40 and 42 of latching or securement channel 38. Foldable handle portion 18 is thus prevented from further downward motion and will not do so even under the application of substantial downward force applied to the free end 56 of foldable handle portion 18.

Foldable handle portion 18 is held in its fully unfolded portion by the cooperation of latching or securement channel 38 with lower latching or securement fin 60. As was discussed above and most clearly seen in FIG. 4, channel 38 defines a latching fin receiving chamber 46 which is somewhat trapezoidal and has a reduced width mouth opening or slot 48. The width of slot 48 is selected to be essentially the same as the width of lower latching fin 60 to thereby provide a frictional fit between between the two. Additionally, the somewhat converging side walls 40 and 42 of securement channel 38 provide a spring-like action. The net effect is a positive retention of lower latching fin 60 in latching fin receiving chamber 46 when the foldable handle portion 18 is in its use position, as seen in FIG. 4.

As seen in FIG. 1, an upper latching or securement fin 80 is molded on the upper surface of inner end 24 of foldable handle portion 18. This upper latching fin has a generally straight leading edge 82 and a somewhat arcuate or curved trailing edge 84. As seen in FIG. 1, these surfaces converge at a point of convergence 86. When the foldable handle portion 18 of the foldable hinged handle assembly 14 is to be placed in the folded or storage mode, as seen in FIG. 2, the foldable handle portion 18 is folded up and into an overlying position with respect to the fixed handle portion 16. As the foldable handle portion 18 is being rotated, the upper latching fin 80 enters the upper portion of latching fin receiving chamber 46. The upper latching or securement fin 80 is sized so that its arcuate surface 84 slidably contacts the upper inner edge of rear wall 44 of latching or securement channel 38. This frictional cooperation is sufficient to hold the handle assembly in the storage configuration shown in FIG. 2. The folded measuring scoop can be subjected to the ordinary handling necessary for packaging and the like and will not start to unfold. Thus it can be readily packed and handled. Further, after the handle has been unfolded for use, it can be refolded for storage. As was indicated above, the thickness of hinge 50 is selected to insure that the plastic measuring scoop 10 of the present invention can be folded and unfolded several hundred times without hinge failure.

As has been previously alluded to, the plastic measuring scoop and foldable handle assembly in accordance with the present invention is a one-piece molded article. It can be made using known plastic molding techniques and equipment and can be mass produced at a reasonable cost. Any number of plastic materials are suitable for use in making the scoop assembly. It has been found that polypropylene plastic resin has the desired characteristics of strength and rigidity to serve as an appropriate material to form the present invention.

While a preferred embodiment of a plastic measuring scoop and foldable handle assembly in accordance with the present invention has been fully and completely set forth hereinabove, it will be apparent to one of skill in the art that a number of changes in, for example, the overall size of the assembly, the shape of the measuring scoop itself, the length of the handle, and the like could be made without departing the true spirit and scope of the present invention which is accordingly to be limited only by the following claims.

What is claimed is:

1. A plastic measuring scoop and foldable handle assembly comprising:

a measuring scoop;

an inner fixed handle portion having a securement channel at its outer end and secured at an inner end to said measuring scoop wherein said securement channel is comprised of spaced side walls interconnected by a rear wall and cooperating to define a securement fin receiving chamber;

an outer foldable handle portion hingedly attached at an inner end to said fixed handle portion outer end wherein said outer foldable handle portion inner end includes an upper and a lower securement fin; and means to selectively retain said foldable handle portion in a folded non-use configuration or an unfolded use configuration with respect to said fixed inner handle portion wherein either of said upper and lower securement fins is relatively receivable in said securement fin receiving chamber to form said means.

2. A plastic molded one piece measuring scoop and foldable handle assembly comprising:

a generally cylindrical measuring scoop including a side wall and a generally planar bottom;

an inner fixed handle portion having an inner end joined to said scoop side wall, said inner fixed handle portion further having a securement channel at an outer end thereof, said securement channel being defined by spaced, converging side walls and an interconnecting rear wall and forming a latching fin receiving chamber; and an outer foldable handle portion joined at an inner end to an outer end of said fixed handle portion by a living hinge, said foldable handle portion having upper and lower latching fins adjacent said inner end thereof, said upper and lower latching fins being selectively receivable in said latching fin receiving chamber to retain said foldable handle portion in a folded non-use configuration or an unfolded use configuration.

3. The plastic molded one piece measuring scoop and foldable handle assembly of claim 2 wherein said plastic is a polypropylene resin.

* * * * *